United States Patent
Lu et al.

(10) Patent No.: US 11,791,068 B2
(45) Date of Patent: Oct. 17, 2023

(54) POST INSULATOR AND DIRECT CURRENT POWER TRANSMISSION DEVICE

(71) Applicants: STATE GRID CORPORATION OF CHINA, Beijing (CN); SINOMA ADVANCED MATERIALS CO., LTD., Beijing (CN); NORTH CHINA ELECTRIC POWER UNIVERSITY, Beijing (CN); SINOMA JIANGXI INSULATOR AND ELECTRICITY CO., LTD., Pingxiang (CN)

(72) Inventors: Licheng Lu, Beijing (CN); Faqiang Yan, Beijing (CN); Bo Qi, Beijing (CN); Zhiyi Chong, Beijing (CN); Chengrong Li, Beijing (CN); Zhijun Guo, Beijing (CN); Xiao Yang, Beijing (CN); Yanxia Ding, Beijing (CN)

(73) Assignees: STATE GRID CORPORATION OF CHINA, Beijing (CN); SINOMA ADVANCED MATERIALS CO., LTD., Beijing (CN); NORTH CHINA ELECTRIC POWER UNIVERSITY, Beijing (CN); SINOMA JIANGXI INSULATOR AND ELECTRICITY CO., LTD., Pingxiang (CN)

( * ) Notice: Subject to any disclaimer, the term of this patent is extended or adjusted under 35 U.S.C. 154(b) by 296 days.

(21) Appl. No.: 17/424,335

(22) PCT Filed: Oct. 14, 2020

(86) PCT No.: PCT/CN2020/120849
§ 371 (c)(1),
(2) Date: Jul. 20, 2021

(87) PCT Pub. No.: WO2021/196562
PCT Pub. Date: Oct. 7, 2021

(65) Prior Publication Data
US 2022/0310288 A1    Sep. 29, 2022

(30) Foreign Application Priority Data
Apr. 2, 2020   (CN) .......................... 202010256071.3

(51) Int. Cl.
*H01B 17/14*   (2006.01)
*H01B 17/32*   (2006.01)
(Continued)

(52) U.S. Cl.
CPC ........... *H01B 17/145* (2013.01); *H01B 17/32* (2013.01); *H01B 17/42* (2013.01); *H02J 3/36* (2013.01)

(58) Field of Classification Search
None
See application file for complete search history.

(56) References Cited

U.S. PATENT DOCUMENTS 2,732,423 A * 1/1956 Morrison ............... H01B 17/32
                                                    174/138 R
5,877,453 A * 3/1999 Hill ...................... H01B 17/325
                                                    174/208
(Continued)

FOREIGN PATENT DOCUMENTS

CN      85 1 02947 A     10/1986
CN      101529679 A       9/2009
(Continued)

OTHER PUBLICATIONS

Office Action issued in corresponding Australian Application No. 2020429373 dated Aug. 1, 2022.
(Continued)

*Primary Examiner* — Krystal Robinson
(74) *Attorney, Agent, or Firm* — Morgan, Lewis & Bockius LLP (57) ABSTRACT

A post insulator includes an insulating post including a first end and a second end that are opposite to each other, a
(Continued)

high-voltage-end grading ring connected to the first end of the insulating post, the high-voltage-end grading ring being insulated from the insulating post, a grounding-end grading ring connected to the second end of the insulating post, the grounding-end grading ring being insulated from the insulating post, and a charge control ring disposed on an outer surface of the insulating post, the charge control ring being insulated from the insulating post, and the charge control ring being configured to accumulate surface charges.

16 Claims, 3 Drawing Sheets

(51) Int. Cl.
    *H01B 17/42*    (2006.01)
    *H02J 3/36*     (2006.01)

(56) References Cited

U.S. PATENT DOCUMENTS

| | | | |
|---|---|---|---|
| 9,728,289 B1 | 8/2017 | Poggi et al. | |
| 2005/0269127 A1* | 12/2005 | Mitchell | H01B 17/325 174/140 C |
| 2011/0000697 A1 | 1/2011 | Tsurimoto et al. | |
| 2016/0197458 A1 | 7/2016 | Yoshitomo et al. | |
| 2022/0310288 A1 | 9/2022 | Lu et al. | |

FOREIGN PATENT DOCUMENTS

| | | |
|---|---|---|
| CN | 201413748 Y | 2/2010 |
| CN | 201707980 U | 1/2011 |
| CN | 101718824 B | 7/2012 |
| CN | 103123833 A | 5/2013 |
| CN | 103545059 A | 1/2014 |
| CN | 203632160 U | 6/2014 |
| CN | 103915227 A | 7/2014 |
| CN | 204290123 U | 4/2015 |
| CN | 105149096 A | 12/2015 |
| CN | 105268556 A | 1/2016 |
| CN | 106054049 A | 10/2016 |
| CN | 110729684 A | 1/2020 |
| CN | 111403128 A | 7/2020 |
| EP | 0 121 133 A2 | 10/1984 |
| EP | 3 096 426 A1 | 11/2016 |
| JP | S5398109 U | 8/1978 |
| JP | S5514288 U | 1/1980 |
| JP | H05234441 A | 9/1993 |
| JP | H11154434 A | 6/1999 |
| RU | 29 402 U1 | 5/2003 |
| RU | 71 828 U1 | 3/2008 |
| SU | 819824 A1 | 4/1981 |
| WO | 2021/196562 A1 | 10/2021 |

OTHER PUBLICATIONS

Office Action issued in corresponding Russian Application No. 2021134620/07 dated Jul. 14, 2022, with English translation.

H. Akkal et al., "Improving Electrical Performance of EHV Post Station Insulators under Severe Icing Conditions Using Modified Gradings Rings", IEEE Transactions on Dielectrics and Electrical Insulation, vol. 20, No. 1, Feb. 2013, pp. 221-228.

F. Huo et al., "Electric field calculation and grading ring design for 750kV four-circuits transmission line on the same tower with six cross-arms", The Journal of Engineering, 2019, vol. 2019, Iss. 16, pp. 3155-3159.

First Office Action issued in corresponding Chinese Patent Application No. 202010256071.3 dated Apr. 2, 2021, with English translation.

International Search Report and Written Opinion issued in corresponding International Application No. PCT/CN2020/120849 dated Jan. 13, 2021, with English translation.

Office Action issued in corresponding Canadian Patent Application No. 3,130,797 dated Nov. 25, 2022.

Office Action issued in corresponding Japanese Patent Application No. 2021-549161 dated Nov. 1, 2022 with English Translation.

\* cited by examiner

POST INSULATOR AND DIRECT CURRENT POWER TRANSMISSION DEVICE

CROSS-REFERENCE TO RELATED APPLICATIONS

This application is a national phase entry under 35 USC 371 of International Patent Application No. PCT/CN2020/120849 filed on Oct. 14, 2020, which claims priority and the benefit to Chinese Patent Application No. 202010256071.3, filed on Apr. 2, 2020, which are incorporated herein by reference in their entirety.

TECHNICAL FIELD

The present disclosure relates to the field of power devices, and in particular, to a post insulator and a direct current power transmission device.

BACKGROUND

A long-distance and large-capacity transmission of electric energy is generally realized by using a direct current (DC) power transmission technology, particularly an ultra-high voltage direct current (UHVDC) transmission technology. At present, a long-distance transmission of electric energy is generally realized by using a direct current power transmission device such as a gas insulated metal enclosed transmission line (GIL).

SUMMARY

In one aspect, embodiments of the present disclosure provide a post insulator. The post insulator includes an insulating post, a high-voltage-end grading ring, a grounding-end grading ring and a charge control ring. The insulating post includes a first end and a second end that are opposite to each other. The high-voltage-end grading ring is connected to the first end of the insulating post, and the high-voltage-end grading ring is insulated from the insulating post. The grounding-end grading ring is connected to the second end of the insulating post, and the grounding-end grading ring is insulated from the insulating post. The charge control ring is disposed on an outer surface of the insulating post, the charge control ring is insulated from the insulating post, and the charge control ring is configured to accumulate surface charges.

In some embodiments, the charge control ring is configured in a way that an ability thereof to accumulate surface charges is stronger than an ability of the insulating post to accumulate surface charges.

In some embodiments, in an axial direction of the insulating post, a distance between the charge control ring and the high-voltage-end grading ring is greater than a distance between the charge control ring and the grounding-end grading ring.

In some embodiments, a material of the charge control ring includes at least one of ion-doped modified silicon nitride, ion-doped modified aluminium oxide, ion-doped modified zirconium oxide, and surface-modified epoxy resin.

In some embodiments, in an axial direction of the insulating post, a dimension of the charge control ring is approximately 20 mm to approximately 30 mm.

In some embodiments, in a radial direction of the insulating post, a dimension of the charge control ring is approximately 5 mm to approximately 10 mm.

In some embodiments, the charge control ring is a ring-shaped protrusion that is coaxial with the insulating post.

In some embodiments, a surface roughness of the charge control ring is less than a surface roughness of the insulating post.

In some embodiments, a material of the high-voltage-end grading ring includes at least one of aluminum, copper, aluminum alloy and copper alloy; and/or a material of the grounding-end grading ring includes at least one of aluminum, copper, aluminum alloy and copper alloy.

In some embodiments, a material of the insulating post includes at least one of epoxy resin and ceramic.

In some embodiments, the high-voltage-end grading ring is sleeved on the first end.

In some embodiments, the high-voltage-end grading ring includes a first grading ring and a first fixing member fixedly connected to the first grading ring. The first fixing member has a first groove at a center of the first grading ring, and the first groove is matched with the first end.

In some embodiments, the grounding-end grading ring is sleeved on the second end.

In some embodiments, the grounding-end grading ring includes a second grading ring and a second fixing member fixedly connected to the second grading ring. The second fixing member has a second groove at a center of the second grading ring, and the second groove is matched with the second end.

In another aspect, embodiments of the present disclosure provide a direct current power transmission device. The direct current power transmission device includes a metal housing with an enclosed space therein, a high-voltage current-conducting rod disposed in the enclosed space of the metal housing, at least one post insulator as described above, the high-voltage-end grading ring of the post insulator being connected to the high-voltage current-conducting rod, and the grounding-end grading ring of the post insulator being connected to the metal housing, and an insulating gas filled in the enclosed space.

In some embodiments, the insulating gas includes sulfur hexafluoride gas or a mixed gas of sulfur hexafluoride gas and nitrogen.

BRIEF DESCRIPTION OF THE DRAWINGS

In order to describe technical solutions in the present disclosure more clearly, the accompanying drawings to be used in the description of some embodiments of the present disclosure will be introduced briefly. However, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual dimensions of products, actual processes of methods and actual timings of signals involved in the embodiments of the present disclosure.

DETAILED DESCRIPTION

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description of the specification, the terms "one embodiment", "some embodiments", "exemplary embodiments", "an example", "specific example(s)", or "some examples" and the like are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Below, the terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of the embodiments of the present disclosure, "a/the plurality of" means two or more unless otherwise specified.

Some embodiments may be described using the expression "connected" along with their derivatives. For example, some embodiments may be described using the term "connected" to indicate that two or more components are in direct physical contact or electrical contact with each other. Of course, the two or more components may also be connected through other components. The embodiments disclosed herein are not necessarily limited in this the content.

Herein, the phrase "at least one of A, B and C" has the same meaning as the phrase "at least one of A, B or C", and both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The term "about" or "approximately" as used herein is inclusive of a stated value and an average value within an acceptable range of deviation for a particular value as determined by a person of ordinary skill in the art, considering the measurement in question and the error associated with the measurement of a particular quantity (i.e., the limitations of the measurement system).

A direct current power transmission device generally includes a metal housing, an insulating gas enclosed in the metal housing, and a post insulator serving as an insulating support member. The insulating support member is one of core components of the direct current power transmission device, and a performance of the insulating support member determines reliabilities of operation and power transmission of the direct current power transmission device.

During production, transportation, installation and operation for an ultra-high voltage direct current power transmission device, particulate matters such as metal and impurities may exist in the ultra-high voltage direct current power transmission device. Free motion of these particulate matters will sharply reduce an insulating strength of the insulating gas, and even cause a distortion of an electric field on a surface of the post insulator and aggravate motion of charges on the surface of the post insulator. As a result, an insulation function of the surface of the post insulator may be damaged to cause failure of an overall insulation of the post insulator.

Some embodiments of the present disclosure provide a direct current (DC) power transmission device, for example, an ultra-high voltage direct current (UHVDC) power transmission device. For example, the UHVDC power transmission device may be a wall bushing or a gas insulated metal enclosed transmission line (GIL).

Figure 1:
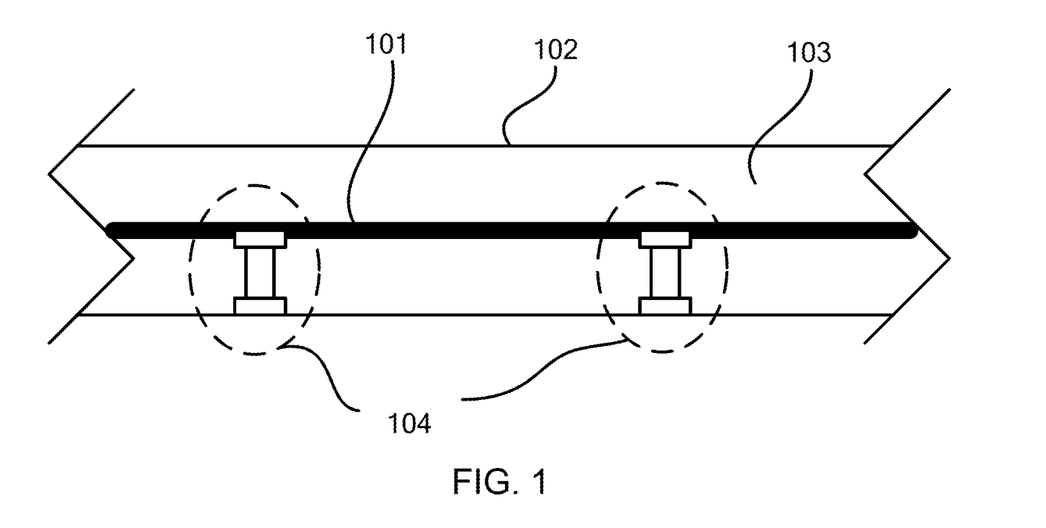
FIG. 1 is a structural diagram of an ultra-high voltage direct current power transmission device in accordance with some embodiments.

Referring to FIG. 1, the DC power transmission device includes a high-voltage current-conducting rod 101, a metal housing 102, an insulating gas 103 and at least one post insulator 104. An interior of the metal housing 102 is an enclosed space, and the metal housing 102 is grounded. The high-voltage current-conducting rod 101 is disposed in the enclosed space of the metal housing 102, and is configured to transmit current. One end of the post insulator 104 is connected to the high-voltage current-conducting rod 101, and the other end of the post insulator 104 is connected to an inner surface of the metal housing 102. The post insulator 104, as an insulating support member, is configured to support the high-voltage current-conducting rod 101 and insulate the high-voltage current-conducting rod 101 from the metal housing 102. The insulating gas 103 is filled in the enclosed space of the metal housing 102. The insulating gas 103 is, for example, sulfur hexafluoride ($SF_6$) gas, or a mixed gas of $SF_6$ gas and nitrogen.

Figure 3:
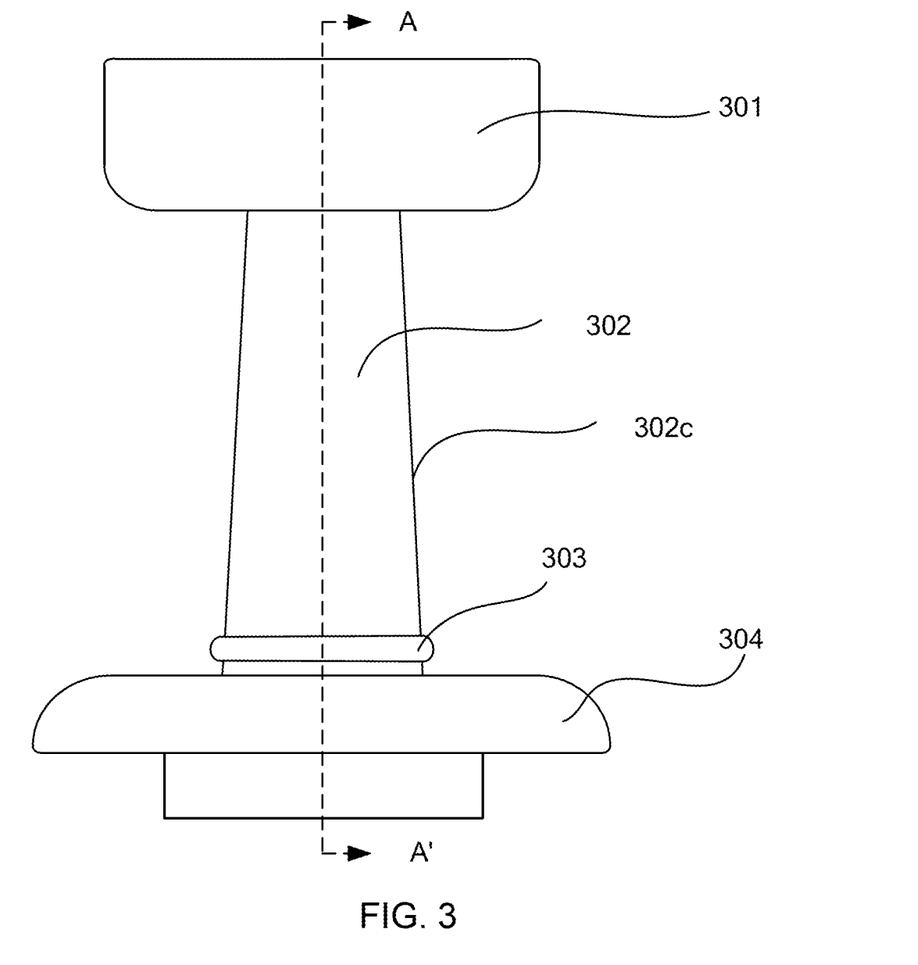
FIG. 3 is a perspective view of a post insulator in accordance with some embodiments.
Figure 4:
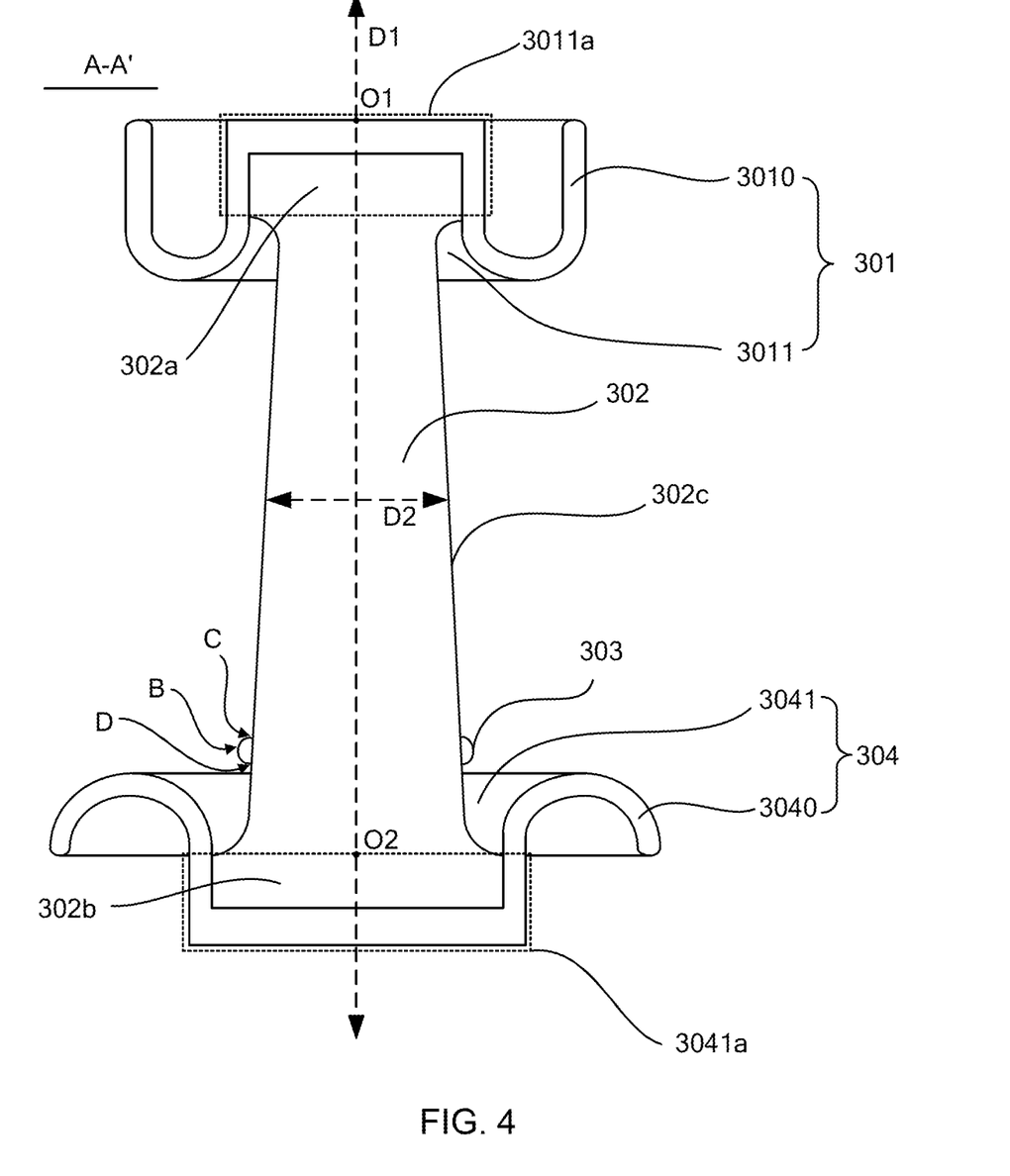
FIG. 4 is a cross-sectional view of the post insulator taken along the A-A' line in FIG. 3 in accordance with some embodiments.

As shown in FIGS. 3 and 4, in some embodiments, the post insulator 104 includes a high-voltage-end grading ring 301, an insulating post 302, a charge control ring 303 and a grounding-end grading ring 304.

As shown in FIG. 4, the high-voltage-end grading ring 301, the charge control ring 303 and the grounding-end grading ring 304 may all be disposed around the insulating post 302.

As shown in FIGS. 3 and 4, the insulating post 302 includes a first end 302a and a second end 302b that are opposite to each other. The high-voltage-end grading ring 301 is connected to the first end 302a of the insulating post 302, and the insulating post 302 is insulated from the high-voltage-end grading ring 301. The grounding-end grading ring 304 is connected to the second end 302b of the insulating post 302, and the insulating post 302 is insulated from the grounding-end grading ring 304.

For example, as shown in FIG. 4, the high-voltage-end grading ring 301 includes a first grading ring 3010 and a first fixing member 3011 fixedly connected to the first grading ring 3010, the first fixing member 3011 has a first groove 3011a at a center O1 of the first grading ring 3010 that is matched with the first end 302a of the insulating post 302, and the high-voltage-end grading ring 301 is sleeved on the first end 302a of the insulating post 302 through the first groove 3011a. The grounding-end grading ring 304 includes a second grading ring 3040 and a second fixing member 3041 fixedly connected to the second grading ring 3040, the second fixing member 3041 has a second groove 3041a at a center O2 of the second grading ring 3040 that is matched with the second end 302b of the insulating post 302, and the grounding-end grading ring 304 is sleeved on the second end 302b of the insulating post 302 through the second groove 3041a. For another example, the high-voltage-end grading ring 301 and the grounding-end grading ring 304 are fixed on the first end and the second end of the insulating post 302 through support rib(s) and bolt(s), respectively. The high-voltage-end grading ring 301 and the grounding-end grading ring 304 are sleeved on the insulating post 302, which may avoid uneven stress and uneven electric field.

The high-voltage-end grading ring 301 is electrically connected to the high-voltage current-conducting rod 101 of the UHVDC power transmission device. The high-voltage-end grading ring 301 is configured to homogenize distribution of an electric field on a high-voltage side of the insulating post 302 where the high-voltage-end grading ring 301 is located. The grounding-end grading ring 304 is electrically connected to the metal housing 102 of the UHVDC power transmission device. The grounding-end grading ring 304 is configured to homogenize distribution of an electric field on a grounding side of the insulating post 302 where the grounding-end grading ring 304 is located. The high-voltage-end grading ring 301 and the grounding-end grading ring 304 may prevent partial discharge on the insulating post 302 caused by uneven distribution of the electric fields, and protect the insulating post 302.

In some embodiments, the high-voltage-end grading ring 301 and the grounding-end grading ring 304 each include a metal material. For example, a material of the high-voltage-end grading ring 301 includes at least one of copper, aluminum, copper alloy and aluminum alloy. A material of the grounding-end grading ring 304 includes at least one of copper, aluminum, copper alloy and aluminum alloy.

The shapes and the geometric dimensions of the high-voltage-end grading ring 301 and the grounding-end grading ring 304 in FIG. 3 are only shown as an example, but embodiments of the present disclosure are not limited thereto, as long as it can be ensured that the high-voltage-end grading ring 301 and the grounding-end grading ring 304 are matched with the insulating post 302, and electric fields on the high-voltage side and the grounding side are uniformly distributed.

In some embodiments, a material of the insulating post 302 includes at least one of epoxy resin and ceramic. For example, the material of the insulating post 302 is ceramic or a ceramic-modified material; or the material of the insulating post 302 is an insulating material based on epoxy resin. In addition, the shape and the geometric dimensions of the insulating post 302 in FIG. 3 is only shown as an example, and do not constitute limitations on the insulating post 302.

As shown in FIGS. 3 and 4, the charge control ring 303 is disposed on an outer surface 302c of the insulating post 302, and the charge control ring 303 is insulated from the insulating post 302. For example, the charge control ring 303 is a ring-shaped member, such as a ring-shaped protrusion, coaxial with the insulating post 302, and the charge control ring 303 is sleeved on the outer surface of the insulating post 302. The charge control ring 303 is configured to accumulate surface charges.

It will be noted that, the insulating post 302 may be solid or hollow, which is not limited in embodiments of the present disclosure, and the charge control ring 303 is disposed on the outer surface of the insulating post 302.

A function of the charge control ring 303 is to accumulate surface charges on its surface under action of a DC electric field of an operating condition to attract particulate matters (e.g., metals or impurities), and the surface charges form an electric field on the surface of the charge control ring 303. When the particulate matters approach the charge control ring 303, the electric field can discharge to generate high energy to enable the particulate matters to undergo a phase change (e.g., liquefaction or sublimation) or a chemical change, thereby eliminating the particulate matters.

In some embodiments, an ability of the charge control ring 303 to accumulate surface charges is stronger than an ability of the insulating post 302 to accumulate surface charges. Here, that the ability of the charge control ring 303 to accumulate surface charges is stronger than the ability of the insulating post 302 to accumulate surface charges means that the charge control ring 303 accumulates surface charges on the surface thereof more easily than the insulating post 302. For example, the charge control ring 303 is made of a material that accumulates surface charges easily.

The surface charges accumulated on the surface of the charge control ring 303 includes surface charges with opposite or the same polarity as charges on the high-voltage side. Since the ability of the charge control ring 303 to accumulate surface charges is stronger than the ability of the insulating post 302 to accumulate surface charges, the number of surface charges accumulated on the surface of the charge control ring 303 is greater than the number of surface charges accumulated on the surface of the insulating post 302 under the action of the DC electric field of the operating condition. The surface charges accumulated on the surface of the charge control ring 303 form an electric field, which can absorb particulate matters in the UHVDC power transmission device. The more surface charges accumulated on the surface of the charge control ring 303 are, the greater the electric field strength of the electric field formed by the surface charges is. In a case where the electric field strength of the electric field on the surface of the charge control ring 303 exceeds a dielectric strength of the surface of the charge control ring 303, the charge control ring 303 will generate surface discharge and/or ground discharge. In this way, surface discharge and/or ground discharge may generate high energy that may cause the phase change (e.g., liquefaction or sublimation) of the particulate matters, thereby eliminating the particulate matters such as metals and impurities.

In some embodiments, the electric field formed by the surface charges on the charge control ring 303 discharges between the charge control ring 303 and the grounding-end grading ring 304, causing a phase change of the particulate matters.

In some embodiments, the electric field formed by the surface charges on the charge control ring 303 discharges between the charge control ring 303 and the metal housing 102, causing a phase change of the particulate matters.

Figure 2:
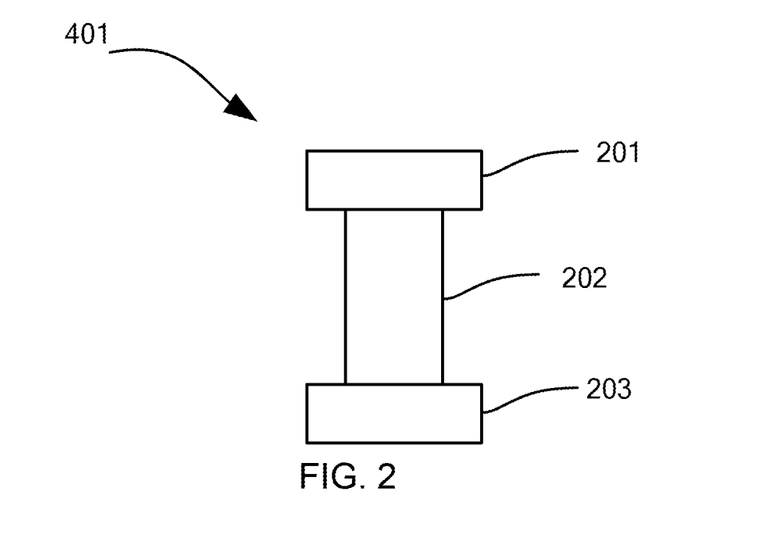
FIG. 2 is a structural diagram of a post insulator for ultra-high voltage direct current transmission in the related art.

As shown in FIG. 2, in the related art, a post insulator 401 includes a high-voltage-end grading ring 201, an insulating post 202, and a grounding-end grading ring 203. Two ends of the insulating post 202 are connected to the high-voltage-end grading ring 201 and the grounding-end grading ring 203, respectively, and the insulating post 202 is insulated from both the high-voltage-end grading ring 201 and the grounding-end grading ring 203. In the related art, the post insulator 401 has no charge control ring, and in a case where the post insulator 401 is applied to a DC power transmission device, a particle trap needs to be provided at a position of the DC power transmission device proximate to the post insulator to collect particulate matters. On the one hand, particulate matters such as metals and impurities may have irreversibly damaged an insulation performance of the post insulator 401 before being trapped. On another hand, in a case where the particle trap restrains a large number of particulate matters such as metals and impurities, there is also a risk that the particulate matters collide with each other to escape from the particle trap. Moreover, in an UHVDC power transmission device, the high-voltage current-conducting rod 101, as a carrier of direct current ultra-high voltage electric energy, will generate heat during use. The heat may cause temperature gradients of the high-voltage current-conducting rod 101, the metal housing 102, and the external environment, thereby forming a circulating airflow in the UHVDC power transmission device, which may blow out the particulate matters such as metals and impurities from the particle trap. Therefore, a manner in which the particle trap is used in the related art is only to collect particulate matters, which cannot completely and effectively restrain and eliminate the particulate matters, and cannot eliminate a potential risk that the particulate matters pose to the post insulator.

In the post insulator 104 provided by some embodiments of the present disclosure, the charge control ring 303 is provided on the surface of the insulating post 302. In one aspect, the charge control ring 303 may accumulate a large number of surface charges on its surface to form an electric field under the action of the DC electric field of the operating condition. In this way, in a case where there are particulate matters such as metals or impurities in the DC power transmission device, these particles may be attracted to approach the charge control ring 303 under the action of an electrostatic induction. In another aspect, since the ability of the charge control ring 303 to accumulate surface charges is stronger than the ability of the insulating post 302 to accumulate surface charges, the charge control ring 303 can accumulate more surface charges on its surface than the insulating post 302. As a result, in a case where surface charges are accumulated on both surfaces of the charge control ring 303 and the insulating post 302, a normal electric field component on the surface of the charge control ring 303 is larger, which makes it easier to adsorb particulate matters. In yet another aspect, since a large number of surface charges accumulated on the surface of the charge control ring 303 will generate a strong electric field, in a case where an electric field strength of the electric field exceeds a dielectric intensity of the surface of the charge control ring 303, surface discharge and/or ground discharge may occur, and insulation between the charge control ring 303 and the high-voltage-end grading ring 301 may still be maintained. Energy generated by the surface discharge and/or the ground discharge may enable the particulate matters such as metals and impurities to undergo phase changes such as liquefaction and sublimation, and may also enable the particulate matters such as metals and impurities to react with surrounding insulating gas (e.g., $SF_6$), so that the particulate matters such as metals and impurities form a composite and are finally deposited at positions of the high-voltage-end grading ring 301, the grounding-end grading ring 304 or the metal housing 102, etc., where surface insulation performance of the post insulator is not affected. Therefore, the potential risk of the particulate matters to the post insulator may be avoided.

It will be seen that the post insulator 104 provided by some embodiments of the present disclosure utilizes the charge control ring 303 to eliminate the particulate matters such as metals or impurities, and in a case where the post insulator 104 is applied to the DC power transmission device, there is no need to provide a particle trap to collect the particulate matters, which avoids problems that may exist in a case where the particle trap is provided in the related art.

In some embodiments, as shown in FIGS. 3 and 4 (a cross-sectional view of the post insulator 104 taken along the A-A' line in FIG. 3), in an axial direction D1 of the insulating post 302, a distance between the charge control ring 303 and the high-voltage-end grading ring 301 is greater than a distance between the charge control ring 303 and the grounding-end grading ring 304. The distance between the charge control ring 303 and the high-voltage-end grading ring 301 refers to a distance between a position of the charge control ring 303 closest to the high-voltage-end grading ring 301 and a position of the high-voltage-end grading ring 301 closest to the charge control ring 303 in the axial direction D1 of the insulating post 302. The distance between the charge control ring 303 and the grounding-end grading ring 304 refers to a distance between a position of the charge control ring 303 closest to the grounding-end grading ring 304 and a position of the grounding-end grading ring 304 closest to the charge control ring 303 in the axial direction D1 of the insulating post 302.

According to finite element analysis of the electric field, in a case where the distance between the charge control ring 303 and the grounding-end grading ring 304 of the insulating post 302 is relatively close (that is, the distance between the charge control ring 303 and the grounding-end grading ring 304 is less than the distance between the charge control ring 303 and the high-voltage-end grading ring 301), when the charge control ring 303 accumulates surface charges, the surface charges have less effect on distribution of the electric field on the high-voltage side than distribution of the electric field on the grounding side. Therefore, the electric field generated by the surface charges accumulated on the surface of the charge control ring 303 may be prevented from affecting the insulation characteristic of the surface of the insulating post 302. In addition, in the case where the distance between the charge control ring 303 and the grounding-end grading ring 304 of the insulating post 302 is relatively close (that is, the distance between the charge control ring 303 and the grounding-end grading ring 304 is less than the distance between the charge control ring 303 and the high-voltage-end grading ring 301), when the surface charges on the charge control ring 303 form an electric field, the electric field is proximate to the grounding-end grading ring 304. Therefore, when the electric field discharges, the particulate matters such as metals and impurities are directly deposited on the grounding-end grading ring 304 or the metal housing 102, which will not affect the high-voltage-end grading ring 301, and the insulation between the charge control ring 303 and the high-voltage-end grading ring 301 may still be maintained.

In some embodiments, a material of the charge control ring 303 includes at least one of ion-doped modified silicon nitride, ion-doped modified aluminium oxide, ion-doped modified zirconium oxide, and surface-modified epoxy resin. For example, one or more of the ion-doped modified silicon nitride or its composite material, the ion-doped modified aluminium oxide or its composite material, the ion-doped modified zirconium oxide or its composite material, ion-doped modified aluminium oxide ceramic, the surface-modified epoxy resin and the like may be used as the material of the charge control ring 303 in embodiments of the present disclosure.

It will be noted that, the ion-doped modified silicon nitride or its composite material, the ion-doped modified aluminium oxide or its composite material, the ion-doped modified zirconium oxide or its composite material, the ion-doped modified aluminium oxide ceramic, the surface-modified epoxy resin and the like are all materials that easily accumulate surface charges and can withstand surface discharge. Therefore, the charge control ring 303 may more easily accumulate surface charges to form an electric field, thereby eliminating particulate matters. In addition, since these materials can withstand surface discharge, the surface discharge will not affect the insulation characteristic of the charge control ring 303 while the particulate matters are eliminated.

In some embodiments, in the axial direction D1 of the insulating post 302, a dimension of the charge control ring 303 is approximately 20 mm to approximately 30 mm, such as 20 mm, 22 mm, 24 mm, 26 mm, 28 mm or 30 mm. The dimension of the charge control ring 303 in the axial direction D1 of the insulating post 302 refers to a distance between two positions that are farthest away from each other on the charge control ring 303 in the axial direction D1 of the insulating post 302. For example, as shown in FIGS. 3 and 4, the charge control ring 303 is in a ring-shape, an outer surface thereof is a continuous arc surface, and a longitudinal section of the charge control ring 303 (a section parallel to the axial direction D1 of the insulating post 302) is in an arc (the position indicated by B in FIG. 4). Thus, the dimension of the charge control ring 303 in the axial direction D1 of the insulating post 302 refers to a distance between two end points (the positions indicated by C and D in FIG. 4) of the arc in the axial direction D1 of the insulating post 302.

In some embodiments, in a radial direction D2 of the insulating post 302, a dimension of the charge control ring 303 is approximately 5 mm to approximately 10 mm, such as 5 mm, 7 mm or 9 mm. The dimension of the charge control ring 303 in the radial direction D2 of the insulating post 302 refers to a distance between the surface of the insulating post 302 and a position on the outer surface of the charge control ring 303 that is farthest away from the surface of the insulating post 302 in the radial direction D2 of the insulating post 302. For example, as shown in FIGS. 3 and 4, the charge control ring 303 is in the ring-shape, and the outer surface thereof is the continuous arc surface, and the longitudinal section of the charge control ring 303 (the section parallel to the axial direction of the insulating post 302) is in the arc (the position indicated by B in FIG. 4). Thus, the dimension of the charge control ring 303 in the radial direction D2 of the insulating post 302 refers to a distance between the surface of the insulating post 302 and a position on the arc that is farthest away from the surface of the insulating post 302 in the radial direction D2 of the insulating post 302.

In a case where the dimension of the charge control ring 303 in the axial or radial direction of the insulating post 302 is too large, the insulation characteristic of the surface of the insulating post 302 may be affected. Therefore, the dimensions of the charge control ring 303 should be controlled within the aforementioned dimension ranges.

In some embodiments, a surface roughness of the charge control ring 303 is less than a first threshold. Since the larger a surface roughness of an object is, the less likely it is to accumulate surface charges, the surface roughness of the charge control ring 303 should be less than the first threshold. A value of the first threshold may be set by a manager according to the material of the charge control ring 303 and experience. The surface roughness refers to a microscopic geometric shape characteristic of peaks and valleys with a small spacing formed on the outer surface of the charge control ring 303 through surface machining.

In some embodiments, the surface roughness of the charge control ring 303 is less than a surface roughness of the insulating post 302. In this way, the number of surface charges accumulated on the surface of the charge control ring 303 may be greater than the number of surface charges accumulated on the surface of the insulating post 302. The surface charges on the charge control ring 303 form an electric field on the surface of the charge control ring 303, so that the electric field can discharge to particulate matters to eliminate the particulate matters, thereby avoiding affecting the insulating post 302.

The foregoing descriptions are merely some specific implementation manners of the present disclosure, but the protection scope of the present disclosure is not limited thereto, and changes or replacements that any person skilled in the art could conceive of within the technical scope disclosed by the present disclosure should be within the protection scope of the present disclosure. Therefore, the protection scope of the present disclosure shall be subject to the protection scope of the claims.

What is claimed is:

1. A post insulator, comprising:
   an insulating post comprising a first end and a second end that are opposite to each other;
   a high-voltage-end grading ring connected to the first end of the insulating post, the high-voltage-end grading ring being insulated from the insulating post;
   a grounding-end grading ring connected to the second end of the insulating post, the grounding-end grading ring being insulated from the insulating post; and
   a charge control ring disposed on an outer surface of the insulating post, the charge control ring being insulated from the insulating post, and the charge control ring being configured to accumulate surface charges.

2. The post insulator according to claim 1, wherein the charge control ring is configured in a way that an ability thereof to accumulate surface charges is stronger than an ability of the insulating post to accumulate surface charges.

3. The post insulator according to claim 1, wherein in an axial direction of the insulating post, a distance between the charge control ring and the high-voltage-end grading ring is greater than a distance between the charge control ring and the grounding-end grading ring.

4. The post insulator according to claim 1, wherein a material of the charge control ring comprises at least one of ion-doped modified silicon nitride, ion-doped modified aluminum oxide, ion-doped modified zirconium oxide, and surface-modified epoxy resin.

5. The post insulator according to claim 1, wherein in an axial direction of the insulating post, a dimension of the charge control ring is approximately 20 mm to approximately 30 mm.

6. The post insulator according to claim 1, wherein in a radial direction of the insulating post, a dimension of the charge control ring is approximately 5 mm to approximately 10 mm.

7. The post insulator according to claim 1, wherein the charge control ring is a ring-shaped protrusion that is coaxial with the insulating post.

8. The post insulator according to claim 1, wherein a surface roughness of the charge control ring is less than a surface roughness of the insulating post.

9. The post insulator according to claim 1, wherein a material of the high-voltage-end grading ring comprises at least one of aluminum, copper, aluminum alloy and copper alloy; and/or
a material of the grounding-end grading ring comprises at least one of aluminum, copper, aluminum alloy and copper alloy.

10. The post insulator according to claim 1, wherein a material of the insulating post comprises at least one of epoxy resin and ceramic.

11. A direct current power transmission device, comprising:
a metal housing with an enclosed space therein;
a high-voltage current-conducting rod disposed in the enclosed space of the metal housing;
at least one post insulator according to claim 1, the high-voltage-end grading ring of the post insulator being connected to the high-voltage current-conducting rod, and the grounding-end grading ring of the post insulator being connected to the metal housing; and
an insulating gas filled in the enclosed space.

12. The direct current power transmission device according to claim 11, wherein the insulating gas comprises sulfur hexafluoride gas or a mixed gas of sulfur hexafluoride gas and nitrogen.

13. The post insulator according to claim 1, wherein the high-voltage-end grading ring is sleeved on the first end.

14. The post insulator according to claim 13, wherein the high-voltage-end grading ring comprises:
a first grading ring; and
a first fixing member fixedly connected to the first grading ring, the first fixing member having a first groove at a center of the first grading ring; wherein the first groove is matched with the first end.

15. The post insulator according to claim 1, wherein the grounding-end grading ring is sleeved on the second end.

16. The post insulator according to claim 15, wherein the grounding-end grading ring comprises:
a second grading ring; and
a second fixing member fixedly connected to the second grading ring, the second fixing member having a second groove at a center of the second grading ring; wherein the second groove is matched with the second end.

* * * * *